United States Patent [19]

Inoue et al.

[11] Patent Number: 5,073,596

[45] Date of Patent: Dec. 17, 1991

[54] POLYPHENYLENE ETHER RESIN COMPOSITION

[75] Inventors: Takayuki Inoue; Kouji Nishida; Keiichi Saito; Kazunobu Nakamori; Takefumi Uematsu; Takeyuki Uchida, all of Yokkaichi, Japan

[73] Assignee: Mitsubishi Petrochemical Co., Ltd., Tokyo, Japan

[21] Appl. No.: 447,539

[22] Filed: Dec. 7, 1989

[30] Foreign Application Priority Data

Dec. 12, 1988 [JP] Japan ................................. 63-311973

[51] Int. Cl.$^5$ ...................... C08L 33/00; C08L 35/00; C08L 53/02; C08L 71/12
[52] U.S. Cl. ..................................... 525/92; 525/148; 525/151; 525/152; 525/181; 525/391; 525/396; 525/397
[58] Field of Search ................ 525/92, 905, 148, 151, 525/152

[56] References Cited

U.S. PATENT DOCUMENTS 4,957,966  9/1990  Nishio et al. ........................ 525/92

*Primary Examiner*—Jacob Ziegler
*Attorney, Agent, or Firm*—Oblon, Spivak, McClelland, Maier & Neustadt

[57] ABSTRACT

A composition which comprises polyphenylene ether, polyamide, rubber-like material, compatibilizing agent having double bond or triple bond, and a polarity such as a carboxyl group, amide group and the like, and a melt tension modifier comprising a compound having oxirane oxygen.

Said composition makes blow molding of large size molded products possible by the effect of decreasing the drawdown of parison during blow molding.

8 Claims, No Drawings

POLYPHENYLENE ETHER RESIN COMPOSITION

BACKGROUND OF THE INVENTION

This invention relates to a novel polyphenylene ether resin composition which is excellent in extruding and blow molding properties, and relates to molded products manufactured therefrom.

Polyphenylene ether has a high glass transition temperature of 210°-220° C. along with high heat resistance, and when molten, it becomes amorphous. It is therefore characterized by its high dimensional accuracy. However, the resin is poor in molding properties and chemical resistance, so it is not appropriate for the resin to be used by itself for manufacturing injection molded or extrusion blown products.

On the other hand, not only does polyamide have a high melting temperature or high glass transition temperature, but it also has low melt viscosity as well as high chemical resistance, so it is used for injection molding. However, polyamide has low melt-tension, therefore it causes high parison sag during blow molding which leads to difficulty in obtaining large size blow molding product by the single use of polyamide. In present blow molding, it is the condition that only a small amount of polyamide is used as gas barrier layer for extruding multi-layer bottle or tank together with polyolefine of high melt-tension.

In recent years, many attempts have been made to obtain polymer alloys which simultaneously have both polyphenylene ether and polyamide features. As disclosed in Japanese Patent Laid-open Nos. 47432/1981, 49753/1981, 36150/1982, etc., polymer alloys for injection molding are provided which have improved mechanical properties, heat resistance and chemical resistanse of both resins. However, when used for blow molding use, the alloys have turned out to be unpractical because they produced a great degree of ununiform section of products due to the great parison sag thereof.

An object of this invention is to substantially improve the parison sag properties of resin composition mentioned above in blow molding while allowing the composition to have high quality in the mechanical properties, heat resistance and chemical resistance just as in those of said polymer alloys. The compositions are, further expected to be used for automotive parts such as a portion of automotive exrerior panels, fuel tanks, oil tanks, radiators, duct hosepipes, harness tubes, air spoilers, bumpers, side protectors, seats, rear shelfs etc. and housings for OA machines, case for musical instruments, etc., or medicine bottles etc.

SUMMARY OF THE INVENTION

This invention is namely intended to achieve the objectives mentioned above by providing compositions comprising the following constitutional components.

This invention provides a resin composition of a melt flow rate (MFR) of 0.01-5 dg/min. and of a melt tension (MT) of at least 4 g which comprises:

10-60 parts by wt. of polyphenylene ether having an intrinsic viscosity [$\eta$] of 0.35-0.75 dl/g measured in chloroform at 30° C., 90-40 parts by wt. of polyamide having a relative viscosity ($\eta r$) of at least 2.5 (measured in 98% $H_2SO_4$ according to JIS K6810);

0.1-30 parts by wt. of rubber-like material relative to the total amount of 100 parts by wt. of polyphenylene ether and polyamide.

0.01-30 parts by wt. of compatibilizing agent, relative to the total amount of 100 parts by wt. of polyphenylene ether, polyamide and rubber-like material, which comprises mixtures of one, two or more types of components selected from the chemical compounds described below, and 0.01-30 parts by wt. of melt tension modifier relative to the total amount of 100 parts by wt. of polyphenylene ether, polyamide and rubber-like material, and said modifier being selected from the organic compounds containing oxirane oxygen, The measurement of the relative viscosity of the polyamide in 98% $H_2SO_4$ according to JIS K6810-1977 is conducted as follows:

Regeant: 98.0±0.2% concentrated sulfuric acid.

Conditioning of Sample: For the sample, use one of not more than 0.3% in water content. For a sample containing water content of more than 0.3%, decrease to not more than 0.3% by drying in a thermostatic dryer at 105°± 5° C.

Operation: Weigh out about 0.25 g of the sample by a chemical balance and transfer to a 100 ml Erlenmeyer flask with ground stopper. Add concentrated sulfuric acid of 98.0°±0.2% to this, so that the sample becomes 0.250±0.001 g per 25 ml of the sulfuric acid and dissolve the sample. Then, put 15 ml of the sample solution completely dissolved into a viscosimeter. After conditioning to 25.0°±0.1° C. in the thermostatic water bath, measure the time when the sample flows down from the upper marked line to the lower marked line of the viscosimeter. In the same way, carry out a blank test of the viscosimeter used for the solvent sulfuric acid. Carry out the measurement of flowing down time four times and take the average of them, discarding the first measured value.

Calculation: Calculate the relative viscosity to one decimal place from the following formula:

$$\eta_r = \frac{T}{T_o}$$

where

T: flowing down time of the sample solution $T_o$: flowing down time of the solvent sulfuric acid.

In addition to the above composition, this invention is intended to provide a compatibilizing agent which is a chemical compound simultaneously having (d1) carbon-carbon double bond or carbon-carbon triple bond and (d2) carboxyl group, acid anhydride group, acid amide group, imide group, carboxylate group, amino group or hydroxyl group, or mixture thereof.

DETAILED DESCRIPTION OF THE INVENTION

Constitutional Components (A) polyphenylene ether

The polyphenylene ether used according to this invention has a repeating structural unit of the general formula,

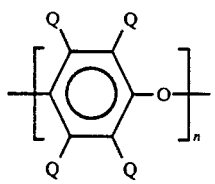

wherein, an ether-oxygen atom of one unit is connected to a benzen nucleus of the neighboring unit, each of Q independently representing a monovalent substituent selected from the group consisting of hydrogen, halogen, hydrocarbon group containing no tertiary carbon atom, halohydrocarbon group having at least 2 carbon atoms between the halogen atom and a phenyl nucleus, hydrocarbon oxy group and a halohydrocarbon oxy group having at least 2 carbon atoms between the halogen atom and the phenyl group, any of Q may be identical or different.

Also a copolymer of 2,6-dimethylphenol and 2,3,6-trimethylphenol, copolymer of 2,6-dimethylphenol and 2,3,5,6-tetramethylphenol, copolymer of 2,6-diethylphenol and 2,3,6-trimethylphenol, and similar copolymers can be given.

In addition, the copolymers can include copolymers which are obtained by grafting styrene monomers (e.g. styrene, p-methylstyrene, alpha-methylstyrene etc.) on the polyphenylene ethers used in this invention and like copolymers, and also modified polylene ether.

The methods for manufacturing polyphenylene ethers corresponding to said ethers have been known, and disclosed, for example, by U.S. Pat. Nos. 3,306,874, 3,306,875, 3,257,357 and 3,257,358, and Japanese Patent Publication No. 17880/1977 and Japanese Patent Laid-open No. 51197/1975.

As for the polyphenylene ethers used in this invention, polyphenylene ethers having an intrinsic viscosity $[\eta]$ being in the range of 0.35–0.75 dl/g measured in chloroform at 30° C. are employed. In less than 0.35 dl/g of intrinsic viscosity, corresponding products unpreferably have poor impact strength, and in more than 0.75 dl/g, they have increased gel content resulting in an undesirable appearance in molded products.

As for the loading proportion of said polyphenylene ethers, being the base material of the compositions of the invention, said ethers are needed to be principally loaded in the compositions. To 10–60 parts by wt. of (A) polyphenylene ether, 90–40 parts by wt. of (B) polyamide is used. Preferably, to 15–55 parts by wt. of (A) polyphenylene ether, 85–45 parts by wt. of (B) polyamide is used.

(B) polyamide

As for polyamides used in this invention, polyamides which are obtained by polycondensation of the aliphatic, alicyclic, aromatic and the like diamines such as hexamethylenediamine, decamethylenediamine, dodecamethylenediamine, decamethylenediamine, 2,2,4- or 2,4,4-trimethylhexamethylenediamine, 1,3- or 1,4-bis-(aminomethyl)cyclohexane, bis(p-aminocyclohexylmethane), m- or p-xylylene diamine, etc., with the aliphatic, alicyclic, aromatic and the like dicarboxylic acids such as adipic acid, suberic acid, sebacic acid, cyclohexane dicarboxylic acid, terepthalic acid; polyamides which are obtained by the condensation of ε-amino caproic acid, 11-amino undecanoic acid and the like; polyamides which are obtained from lactams such as ε-caprolactam, ω-laurolactam etc. or copolymerized polyamides obtained from these components; and the mixtures said polyamides can be illustrated. Concretely, nylon 6, nylon 66, nylon 610, nylon 9, nylon 11, nylon 12, nylon 6/66, nylon 66/610, nylon 6/11 etc. can be given. Among these, nylon 6 and nylon 66 having relatively higher melting points and excellent stiffness along with being relatively economical are most commonly used. As for molecular weight, a polyamide having a relative viscosity ($\eta r$) of not less than 2,5 (measured in 98% sulfuric acid according to JIS K6810) is usually used. A polyamide having a relative viscosity of not more than 2.5 is unpreferable because its melt flow rate (MFR) will exceed 5 (dg/min.) providing decreased fabricating properties. And a polyamide having a relative viscosity of not less than 4.0 is desirable because it has little parison sag of melt parison permitting a stable molding of medium or large size product with a parison length of more than 1 m.

(C) rubber-like material

In this invention, natural or synthetic rubber-like material can be used as impact modifier. As examples of rubber used in this invention, natural and synthetic rubbers, e.g. polybutadiene, polyisoprene are given, or copolymers obtained from said dienes and vinyl monomer, e.g. styrene being an aromatic monomer are given.

As for preferable examples of rubber or rubber-like polymers, natural rubber, SBR type rubber, synthetic GR-N type rubber, and synthetic rubber made from butadiene, butadiene-styrene or isoprene, polychloroprene, e.g. neoprene; polyisobutylene and copolymers of isobutylene with butadiene or with isoprene; polyisoprene; copolymers of ethylene with propylene and copolymers of these olefins with butadien; Thiokol rubber; acrylic rubber; polyurethane rubber: copolymers of dienes e.g. butadiene and isoprene with various type of monomers e.g. alkyl unsaturated ester (e.g. methyl methacrylate), unsaturated ketone, e.g. methyl isopropenyl ketone, and vinyl heterocyclic compounds, e.g. vinylpyridine; polyether rubber; epichlorohydrin rubber, etc. are given.

Particularly preferable, are styrene-butylene-styrene triblock copolymers with a styrene content of not less than 10%, or the hydrogenated product thereof or at least one, two or more combinations of ethylene-propylene rubber and ethylene-butene rubber, each of which are modified with alpha, beta-unsaturated carboxylic acid, and a combination of aforementioned rubbers. The styrene content of styrene-butylene-styrene triblock copolymer is at least 10 wt. %, and if it is less than 10 wt. %, the copolymer will have unpreferably decreased compatibity with polyphenylene ether.

The loading amount of rubber-like material (C) is not particularly restricted, and usually in the range of 0.1–30 parts by wt., preferably 0.5–20 parts by wt., and particularly preferably 1.0–15 parts by wt. When the content is too great, the melt tension thereof may undesirably lower.

(D) compatibilizing agent

Compatibilizing agents are compounds which compatibilize polyphenylene ether with polyamide. As the compatibilizing agents, compounds simultaneously having (d1) carbon-carbon double bond or carbon-carbon triple bond, and (d2) carboxyl group, acid anhydride group, acid amide group, imide group, carboxylate group, amino group or hydroxyl group are employed. As for concrete examples thereof, maleic anhydride, maleic acid, fumaric acid, maleic hydrazide, reaction products of maleic acid with diamines, e.g. one having the formula

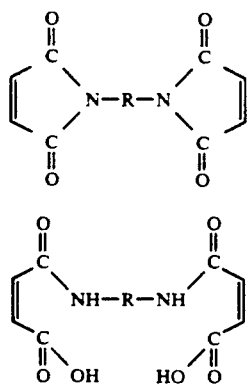

(wherein R represents an aliphatic or aromatic group); methyl nadic anhydride, dichloromaleic anhydride, maleic acid amide; natural fats and oils such as soybean oil, tung oil. castor oil, linseed oil, hempseed oil, cottonseed oil, sesame oil, rape seed oil, peanut oil, camellia oil, olive oil, palm oil, sardine oil; epoxidized natural oils such as epoxidized soybean oil, etc.; unsaturated carboxylic acids such as acrylic acid, butenoic acid, crotonic acid, vinyl acetic acid, methacrylic acid, pentenoic acid, angelic acid, tiglic acid, 2-pentenoic acid, 3-pentenoic acid, alpha-ethylacrylic acid, beta-methylcrotonic acid, 4-pentenoic acid, 2-hexenoic acid, 2-methyl-2-pentenoic, 3-methyl-2-pentenoic acid, alpha-ethylcrotonic acid, 2,2-dimethyl-3-butenoic acid, 2-heptenoic, 2-octenoic, 4-decenoic, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenioc acid, erucic acid, tetracosenoic acid, 2,4-pentadienoic acid, 2,4-hexadienoic acid, diallyl acetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, recinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid, etc.; or esters, acid amides and anhydrides of these unsaturated carboxylic acids; alcohols or unsaturated alcohols such as allyl alcohol, crotyl alcohol, methyl vinyl carbinol, allyl carbinol, methyl propenyl carbinol, 4-pentene-1-ol, 10-undecene-1-ol, propagyl alcohol, 1,4-pentadiene-3-ol, 1,4-hexadiene-3-ol, 3,5-hexadiene-2-ol, 2,4-hexadiene-1-ol, and alcohols of the general formulae $C_nH_{2n-5}OH$, $C_nH_{2n-7}OH$ or $C_nH_{2n-9}OH$ wherein n is a positive integer, 3-buten-1,2-diol, 2,5-dimethyl-3-hexene-2,5-diol, 1,5-hexadiene-3,4-diol, 2,6-octadiene-4,5-diol, etc,; or unsaturated amines obtained from said unsaturated alcohols by substituting —NH2 groups for the OH groups of said alcohols; or addition products of maleic anhydride to low polymers (of which average molecular weight ranges from about 500 to about 10,000) or to high polymers (e.g. a polymer with an average molecular weight of at least 10,000) of, e.g., butadiene, isoprene, etc.; or compounds which are obtained by introducing amino groups, carboxyl groups, hydroxyl groups, etc into to said low or high polymers can be given.

As for compatibilizing agents employed in this invention, one, two or more types thereof can be used together.

The loading amount of compatibilizing agent (D) is not particularly restricted, but usually is in the range of 0.01-30 parts by wt. preferably 0.05-10 parts by wt. and particularly 0.1-8 parts by wt. relative to the sum of 100 parts by wt. of (A) polyphenylene ether, (B) polyamide and (C) impact modifier. If the loading amount is too much, the heat resistance of the compositions will be unpreferably decreased.

(E) melt tension modifying agent

As a melt tension modifying agent used in this invention, which raises the melt tension of the compositions, an organic compound containing oxirane oxygen is employed.

Concretely, the melt tension modifier is an epoxidized liquid polybutadiene having at least 0.07 wt. % of oxyrane oxygen; a bipolymer of glycidyl methacrylate and ethylene or a terpolymer comprising a third component of monomer being capable of copolymerizing with ethylene having at least 1 wt. % of glycidyl group.

The epoxidized liquid polybutadiene is obtained by adding one atom of oxygen to the ethylenic bonding of liquid polybutadiene, which has an oxyrane oxygen content of at least 0.07 wt. % and a molecular weight ranging from 500 to 10,000.

Oxirane oxygen is oxygen added to the ethylenic bond, and oxirane oxygen content is a wt. % of the oxirane oxygen in the epoxidized liquid polybutadiene. The microstructure of the double bond of epoxidized liquid polybutadiene, i.e. the proportions of vinyl group and trans-1,4 structure are permitted to be included by this invention in spite of the values of the proportions. The epoxidized liquid polybutadiene used by this invention is not particularly restricted by methods of preparation thereof.

The oxirane oxygen content of epoxidized liquid polybutadiene used by this invention is at least 0.07 wt. %. When the content is less than this value, the effect of the modifier for improving melt tension is undesirably poor.

A bipolymer comprising ethylene and at least glycidyl methacrylate, or a terpolymer comprising said bipolymer and a third component of monomer capable of copolymerizing with ethylene can be used. In particular, modifiers having at least 1 wt. % of glycidyl content are desirable. As for the melt tension modifiers used in this invention, one, two or more types thereof may be used simultaneously.

The loading amount of melt tension modifiers (E) is not particularly restricted, but usually is in the range of 0.01-30 parts by wt. and preferably 0.05-10 parts by wt. relative to the total amount of 100 parts by wt. of (A) polyphenylene ether, (B) polyamide and (C) rubber-like material. If the loading amount is excessive, the products to be obtained will have undesirably poor appearance.

The compositions according to this invention can be additionaly loaded with antioxidant, ultraviolet absorber, plasticizer, lubricant, fire retardant, antistatic agent, coloring agent, polyfunctional curing agent, titanium dioxide, talc and a various types of fillers, and the like.

EVALUATION METHOD (1) Melt flow rate (MFR)
According to JIS K7210.
Wherein, measuring temperature was 280° C., and applied load was 5 kg.

(2) Melt tension (MT)
A melt tension tester made by Toyo Seiki Seisakusho was used. A 6 g of sample was preheated at 270° C. for 5 min., and its MT was measured at conditions of an extrusion speed of 10 mm/min. and a pulling speed of 1.3 m/min. A nozzle for measuring "melt flow rate" was used.

(3) Parison sag characteristics
Using a small-size blow molding machine IPB-10A made by Ishikawajima-Harima Heavy Industries Co., Ltd., a 60 cm length of parison was extruded at a preset temperature of 250° C. and at an extrusion pressure of 50 kg/cm2, and allowed to sit to evaluate its sag characteristics with the change in the length of parison.

(4) Impact resistance
Using a small-size blow molding machine IPB-10A made by Ishikawajima-Harima Heavy Industries Co., Ltd., a 400-cc small bottle was molded at a preset temperature of 250° C. and at an injection pressure of 50 kg/cm2, the bottle then being filled with water to allow the bottle to be dropped from a position 2 m high.

EXAMPLES

This invention will be more particularly illustrated by way of the following examples.

EXAMPLE 1

Poly2,6-dimethylphenol having an intrinsic viscosity [$\eta$] of 0.5 dl/g measured in chloroform at 30 C; nylon 6 and nylon 66 having relative viscosties ($\eta r$) of 6.8 and 4.0 measured in 98% $H_2SO_4$ respectively; styrene-butylene-styrene triblockcopolymer having a styrene content of 15 wt. %; maleic anhydride; and epoxidized liquid polybutadiene (BF-1000, made by Adeka Argus Co., Ltd.) having an oxirane oxygen content of 7.5 wt. % and a molecular weight of about 1000 were homogeneously mixed according to the proportions shown in TABLE 1. Using a twin-screw extruder, the mixture was kneaded at a preset temperature of 280° C. to produce a testing sample in pellets. After drying the pellets, the items regarding physical properties test, molding test and products test shown in TABLE 1 were evaluated, and the results are given in said TABLE.

In the TABLE 1, each symbol denotes assesed grade described below:
◎ Excellent
○ Good
△ Inferior
× poor

COMPARATIVE EXAMPLES 1 and 2

Except that in place of the polyphenylene ether used in EXAMPLE 1, 2,6-dimethylphenol having intrinsic viscosities of 0.3 and 0.9 dl/g was employed, the compositions obtained according to EXAMPLE 1 were tested. The results are shown in TABLE 1.

EXAMPLE 2

Except that in place of the polyamides used in EXAMPLE 1, nylon 6 and nylon 66 having relative viscosities of 4.0 and 4.0 relatively measured in 98% $H_2SO_4$ were used, the composition obtained according to EXAMPLE 1 was tested. The results are shown in TABLE 1.

EXAMPLE 3

Except that in place of the polyamides used in EXAMPLE 1, nylon 6 having a relative viscosity of 6.8 measured in 98% $H_2SO_4$ was used, the composition obtained according to EXAMPLE 1 was tested, The results are shown in TABLE 1.

COMPARATIVE EXAMPLE 3

Except that in place of the polyamides used in EXAMPLE 1, nylon 6 and nylon 66 having relative viscosities of 2.3 and 2.5 each measured in 98% $H_2SO_4$ were used, the composition obtained according to EXAMPLE 1 was tested, The results are shown in TABLE 1.

COMPARATIVE EXAMPLE 4

Except that in place of the polyamides used in EXAPLE 1, nylon 6 having a relative viscosity of 2.3 measured in 98% $H_2SO_4$ was used, the composition obtained according to EXAMPLE 1 was tested, The results are shown in TABLE 1.

COMPARATIVE EXAMPLE 5

Except for lack of the styrene-butylene-styrene triblock copolymer used in EXAMPLE 1, the composition obtained according to EXAMPLE 1 was tested. The results are shown in TABLE 1.

COMPARATIVE EXAMPLE 6

Except for lack of the maleic anhydride used in EXAMPLE 1, the composition obtained according to EXAMPLE 1 was tested. The results are shown in TABLE 1.

COMPARATIVE EXAMPLE 7

Except for lack of the epoxidized liquid polybutadiene used in EXAMPLE 1, the composition obtained according to EXAMPLE 1 was tested. The results are shown in TABLE 1.

EXAMPLE 4

Except that in place of the epoxidized liquid polybutadiene, ethylene-glycidyl methacrylate copolmer (containing 10 wt. % of glycidyl methacrylate) was used along with 3.5 wt. % of styrene-butylene-styrenc triblock copolymer was used, the composition obtained according to EXAMPLE 1 was tested. The results are shown in TABLE 1.

COMPARATIVE EXAMPLE 8 and 9

Except for mixing polyphenylene ether with polyamide according to the composition ratio shown in the TABLE, the compositions obtained according to the EXAMPLE 4 were tested. The results are shown in TABLE 1.

COMPARATIVE EXAMPLE 10

Except for using excess of ethylene-glycidyl methacrylate compared with that in EXAMPLE 4, the composition obtained according to EXAMPLE 4 was tested. The results are shown in TABLE 1.

COMPARATIVE EXAMPLE 11

Except for using excess of maleic anhydride compared with that in EXAMPLE 4, the composition obtained according to EXAMPLE 4 was tested. The results are shown in TABLE 1.

the composition obtained according to Example 4 was tested. The results are shown in Table 1.

TABLE 1

| Constituting component | Item | Example 1 | Comparison Example 1 | Comparison Example 2 | Example 2 | Example 3 | Comparison Example 3 | Comparison Example 4 | Comparison Example 5 | Comparison Example 6 | Comparison Example 7 |
|---|---|---|---|---|---|---|---|---|---|---|---|
| Polyphenylene ether | [η] (dl/g) | 0.5 | 0.3 | 0.9 | | | 0.5 | | | 0.5 | |
| | Rate (part by wt.) | 50 | 50 | 50 | | | 50 | | | 50 | |
| Polyamide | Type (1) | | nylon 6 | | nylon 6 | nylon 6 | nylon 6 | nylon 6 | nylon 6 | nylon 6 | |
| | ηr | | 6.8 | | 4.0 | 6.8 | 2.3 | 2.3 | | 6.8 | |
| | Rate (part by wt.) | | 25 | | 25 | 50 | 25 | 50 | | 25 | |
| | Type (2) | | nylon 66 | | nylon 66 | | nylon 66 | | | nylon 66 | |
| | ηr | | 4.0 | | 4.0 | | 2.5 | | | 4.0 | |
| | Rate (part by wt.) | | 25 | | 25 | 0 | 25 | 0 | | 25 | |
| Impact modifier | Type | Styrene-butylene-styrene triblock (St. 15 wt. %) | ← | ← | ← | ← | ← | ← | ← | ← |
| | Rate (part by wt.) | 12.5 | | | ← | ← | ← | ← | 0 | 12.5 | ← |
| Compati-bilizing agent | Type | Maleic anhydride | ← | ← | ← | ← | ← | ← | ← | ← |
| | Rate (part by wt.) | 0.5 | | | ← | ← | ← | ← | ← | 0 | 0.5 |
| Melt tension modifier | Type | Epoxidized liquid polybutadiene (BF-1000) | ← | ← | ← | ← | ← | ← | ← | ← |
| | Rate (part by wt.) | 0.3 | | | ← | ← | ← | ← | ← | ← | 0 |
| Fundamental properties | MFR (dg/min.) | 0.5 | 2.5 | 0.05 | 5 | 1.0 | 10 | 15 | 1.0 | 0.3 | 5 |
| | MT (g) | 8 | 3 | 10 | 4 | 7 | 1 | 1 | 8 | 9 | <1 |
| Blow molding properties | Parison Length (cm) | | | | | | | | | | |
| | 10 sec. | 66 | 70 | 65 | 69 | 67 | break | break | 67 | 65 | break |
| | 20 sec. | 67 | 80 | 66 | 74 | 68 | 24 | 24 | 68 | 67 | |
| | 30 sec. | 68 | 85 | 66 | 83 | 69 | | | 68 | 68 | |
| Product 400 cc bottle | Appearance of product | ○ | ⊚ | X | ⊚ | ○ | ⊚ | ⊚ | ○ | Δ | ○ |
| | Impact resistance | ○ | X | ○ | ○ | ○ | Δ | Δ | X | X | ○ |

| Constituting component | Item | Example 4 | Comparison Example 8 | Comparison Example 9 | Comparison Example 10 | Comparison Example 11 | Comparison Example 12 |
|---|---|---|---|---|---|---|---|
| Polyphenylene ether | [η] (dl/g) | 0.5 | 0.5 | 0.5 | | 0.5 | |
| | Rate (part by wt.) | 50 | 4 | 70 | | 50 | |
| Polyamide | Type (1) | nylon 6 | nylon 6 | nylon 6 | | nylon 6 | |
| | ηr | 6.8 | 6.8 | 6.8 | | 6.8 | |
| | Rate (part by wt.) | 25 | 48 | 15 | | 25 | |
| | Type (2) | nylon 66 | nylon 66 | nylon 66 | | nylon 66 | |
| | ηr | 4.0 | 4.0 | 4.0 | | 4.0 | |
| | Rate (part by wt.) | 25 | 48 | 15 | | 25 | |
| Impact modifier | Type | Styrene-butylene-styrene triblock | ← | ← | ← | ← | ← |
| | Rate (part by wt.) | 3.5 | | | | | 35 |
| Compati-bilizing agent | Type | Maleic anhydride | ← | ← | ← | ← | ← |
| | Rate (part by wt.) | 0.5 | | | | 35 | 0.5 |
| Melt tension modifier | Type | Ethylene-glycidyl methacrylate | ← | ← | ← | ← | ← |
| | Rate (part by wt.) | 9 | | | 35 | 9 | ← |
| Fundamental properties | MFR (dg/min) | 1.0 | 15 | — | 5 | >>100 | 1 |
| | MT (g) | 11 | 4 | 30 | >50 | 7 | 1 |
| Blow molding properties | Parison Length (cm) | | | | | | |
| | 10 sec. | 65 | 70 | 62 | 60 | Break | 63 |
| | 20 sec. | 66 | 78 | 62 | 61 | | 65 |
| | 30 sec. | 66 | 86 | 62 | 61 | | 69 |
| Product 400 cc bottle | Appearance of product | ○ | ⊚ | X | X | Δ | Δ |
| | Impact resistance | ○ | Δ | Δ | ○ | ○ | ○ |

Note:
← mark represents same to the left.

COMPARATIVE EXAMPLE 12

Except for using excess of styrene-butylene-styrene triblock copolymer compared with that in Example 4, This invention provides compositions which are composed of the components described above, therefore the compositions retain heat resistance, impact resistance, chemical resistance, etc. being the desirable properties of a polymer alloy composed of polyphenylene ether and polyamide, and can improve molding properties which have been problems to be solved, especially extrusion and blow molding properties.

What is claimed is:

1. A resin composition, used for extrusion molding or blow molding process, having a melt flow rate (MFR) of 0.01-5 dg/min. and a melt tension (MT) of at least 4 g. which comprises:
    10-60 parts by wt. of polyphenylene ether having an intrinsic viscosity $[\eta]$ of 0.35-0.75 dl/g measured n in chloroform at 30° C.;
    90-40 parts by wt. of polyamide having a relative viscosity ($\eta r$) of at least 4.0 (measured in 98%$H_2SO_4$ according to JIS K6810);
    0.1-30 parts by wt. of rubber-like material relative to the total amount of 100 parts by wt. of polyphenylene ether and polyamide;
    0.01-30 parts by wt. of compatibilizing agent, relative to the total amount of 100 parts by wt. of polyphenylene ether, polyamide and rubber-like material, said compatibilizing agent being selected from chemical compounds simultaneously having a carbon—carbon double bond or carbon—carbon triple bond, and a carboxyl group, acid anhydride group, acid amide group, imide group, carboxylate group, amino group, or hydroxyl group, or mixture thereof;
    0.01-30 parts by wt. of melt tension modifier relative to the total amount of 100 parts by wt. of polyphenylene ether, polyamide and rubber-like material, said modifier being selected from organic compounds containing oxirane oxygen.

2. A resin composition according to claim 1 wherein said compatibilizing agent is a compound having a carbon—carbon double bond and a carboxyl group, acid anhydride group, acid amide group, acid imide group, amino group or hydroxyl group.

3. A resin composition according to claim 2 wherein said compatibilizing agent is a compound having a carbon—carbon double bond and a carboxyl group or acid anhydride group.

4. A resin composition according to claim 2 wherein said compatibilizing agent is a compound selected from maleic acid, maleic anhydride, fumaric acid, maleimide and maleic hydrazide and the reaction products of maleic anhydride with diamines.

5. A resin composition according to claim 1 wherein said rubber-like material is selected from a group comprising styrene-butylene-styrene triblock copolymer having a styrene content of at least 10 wt. %, the hydrogenated compound thereof, ethylene-propylene rubber or ethylene-butene rubber, each of which is modified with alpha, beta-unsaturated carboxylic acid, and a combination of the aforementioned rubbers.

6. A resin composition according to claim 1 wherein said melt tension modifier is an epoxidized liquid polybutadiene having at least 0.07 wt. % of oxirane oxygen.

7. A resin composition according to claim 1 wherein said melt tension modifier is an epoxidized liquid polybutadiene.

8. A resin composition according to claim 1 wherein said melt tension modifier is a bicopolymer of ethylene and glycidyl methacrylate or a terpolymer comprising these components and a third component of monomer capable of copolymerizing with ethylene, wherein the content of glycidyl group is at least 1 wt. %.

* * * * *